US006959895B2

(12) United States Patent
Cylinder (10) Patent No.: US 6,959,895 B2
(45) Date of Patent: Nov. 1, 2005

(54) DUAL WING-PAIR AIR VEHICLE

(75) Inventor: David A. Cylinder, New Egypt, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 36 days.

(21) Appl. No.: 10/774,653

(22) Filed: Feb. 4, 2004

(65) Prior Publication Data

US 2005/0178896 A1 Aug. 18, 2005

(51) Int. Cl.$^7$ ............................................. B64C 33/02
(52) U.S. Cl. ........................... 244/22; 244/11; 244/72; 416/81; 416/82
(58) Field of Search .............................. 244/22, 11, 72; 440/14, 15; 416/59, 81, 79, 82

(56) References Cited

U.S. PATENT DOCUMENTS

| | | | |
|---|---|---|---|
| 6,082,671 A | 7/2000 | Michelson | |
| 6,206,324 B1 * | 3/2001 | Smith | ........................... 244/72 |
| 6,626,398 B1 | 9/2003 | Cox et al. | |

OTHER PUBLICATIONS http://www.detnews.com/pix/2004 / 02 / 12 / metro / m012-dragon-0204n-4.jpg.*
http://www.turtletrack.org/Issues04/Co03202004/Art/dragonfly_Cb.jpg.*
http://wings.avkids.com/Book/Animals/instructor/insects-02.html.*
http://orion.animaltracks.net/wingc.html.*
BITE-Wing, http://techtransfer.nrl.navy.mil/exhibits/pdfs/Info%20Sheet%20pdfs/UAV%20Info%20Sheets/BITE-Wing.pdf.* http://www.rvc.ac.uk/Research/PDFs/JW05.pdf (Dragonfly Flight) called Bio Flight by Examiner.*
Kellogg, J., Bovais, C., Cylinder, D., Dahlburg, J., Foch, R., Platzer, M., Rammamurti, R., and Sandberg, W.C., "Nonconventional Aerodynamics for Micro-UAVs", Proc. 16th International UAV Systems Conference, Bristol, UK, Apr. 2001.
Kellogg, J., Bovais, C., Cylinder, D., Dahlburg, J., Foch, R., Cylinder, D., Ramamurti, R., Sandberg, W.C., Gardner, J., Srull, D., Piper, G., Vaiana, P., and Kahn, A., Development and Testing of Unconventional Micro Air Vehicle Configurations, Proc. of Unmanned/Unlimited Conference, AIAA, Set. 2003.
Grasmeyer, Joel M., and Keenon, Matthew, "Development of the Black Widow Micro Air Vehicle", AIAA Paper 2001-0127 (AIAA Accession No. 16057) Aerospace Sciences Meeting and Exhibit, 39th, Reno, NV, Jan. 8-11, 2001.
Kellogg, J., Bovais, C., Dahlburg, J., Foch, R., Gardner, J., Gordon, D., Hartley, R., Karngar-Parsi, B., McFarlane, H., Pipitone, F., Ramamurti, R., Sciambi, A., Spears, W., Srull, D., and Sullivan, C., "The NRL Mite Air Vehicle", Proceedings of the Bristol RPV/AUV Systems Conference (2001).

(Continued)

Primary Examiner—Peter M. Poon
Assistant Examiner—Timothy D. Collins
(74) Attorney, Agent, or Firm—John J. Karasek; Sally A. Ferrett (57) ABSTRACT

A vehicle for flying and having a forward portion and a rearward portion opposite the forward. The vehicle includes a first pair of wings arranged at the forward portion of the vehicle, a second pair of wings arranged at the rearward portion of the vehicle, and a support structure. The support structure is connected to the forward pair of wings and connected to the rearward pair of wings, the support structure being arranged to drive the forward pair of wings alternately toward each other and apart and drives the second pair of wings alternately toward each other and apart.

37 Claims, 8 Drawing Sheets

OTHER PUBLICATIONS

Lian, Y., Shyy, W. and Ifju. P.J., "Membrane Wing Model for Micro Air Vehicles", AIAA Journal, Vol. 41, No. 112, Dec. 2003.

Mueller, T. J. and DeLaurier, J. D., "Aerodynamics of Small Vehicles", Annu. Rev. Fluid. Mech. 200335:89-111 (Jan. 2003).

Technology Transfer Sheet, BITE-Wing Biplane Insectoid Travel Engine, [online], Jul. 29, 2004, [retrieved on May 2, 2005], retrieved from Naval Research Laboratory using Internet <URL: http://techtransfer.nrl.navy.mil/exhibits/pdfs/Info%20Sheet%20pdfs/UAV%20Info%20Sheets/BITE-Wing.pdf >.

* cited by examiner

DUAL WING-PAIR AIR VEHICLE

TECHNICAL FIELD

This invention is related to lightweight unmanned air vehicles, and more specifically, to battery powered, remotely controlled air vehicles.

BACKGROUND

Uninhabited or unmanned aerial vehicles (UAVs) have been in use for several years for various purposes including carrying sensors, reconnaissance, and communications. Some unmanned vehicles are useful for flying into areas in which a manned aircraft would be at risk due to enemy fire, airborne contaminants, and other dangers. Examples are found in U.S. Pat. No. 6,626,398 to Cox et al. and in U.S. Pat. No. 6,082,671 to Michelson.

In the mid 1990's, the Defense Advanced Research Project Agency (DARPA) funded development of micro-air vehicles. DARPA defined micro-air vehicles as being six inches or fewer in length, width, and height. The term micro-air vehicle can also refer to flying devices which are smaller or larger than this approximate size.

Examples of small propellor driven flying devices are found in "The NRL MITE Air Vehicle", Proceedings of the Bristol RPV/AUV Systems Conference, 2001, by Kellogg, J., Bovais, C., Dahlburg, J., Foch, R., Gardner, J., Gordon, D., Hartley, R., Kamgar-Parsi, B., McFarlane, H., Pipitone, F., Ramamurti, R., Sciambi, A., Spears, W., Srull, D., and Sullivan, C.

Some other examples of small unmanned vehicles are disclosed in "Nonconventional Aerodynamics for Micro-UAVs", Proc. 16th International UAV Systems Conference, Bristol, UK, April 2001 by Kellogg, J., Bovais, C., Cylinder, D., Dahlburg, J., Foch, R., Platzer, M., Ramamurti, R., and Sandberg, W. C. and in "Development and Testing of Unconventional Micro Air Vehicle Configurations", Proc. of Unmanned/Unlimited Conference, AIAA, September 2003 by Kellogg, J., Bovais, C., Cylinder, D., Dahlburg, J., Foch, R., Ramamurti, R., Sandburg, W. C., Gardner, J., Srull, D., Piper, G., Vaiana, P., and Kahn, A.

SUMMARY

One embodiment of the invention is a vehicle for flying and having a forward portion and a rearward portion opposite the forward. The vehicle includes a first pair of wings arranged at the forward portion of the vehicle, a second pair of wings arranged at the rearward portion of the vehicle, and a support structure. The support structure is connected to the forward pair of wings and connected to the rearward pair of wings, the support structure being arranged to drive the forward pair of wings alternately toward each other and apart and drives the second pair of wings alternately toward each other and apart.

Another embodiment of an air vehicle includes a body, a first pair of wings, each wing being connected to one of the structural members at a midspan of the wing, and a second pair of wings, each wing being connected to one of the structural members at a midspan of the wing. The body has two ends, at least one pivot point, and at least two structural members connected at the pivot point. A drive mechanism is adapted to drive the first pair of wings toward each other and apart and to drive the second pair of wings toward each other and apart to propel the vehicle forward.

DETAILED DESCRIPTION OF PREFERRED EMBODIMENTS

Figure 1:
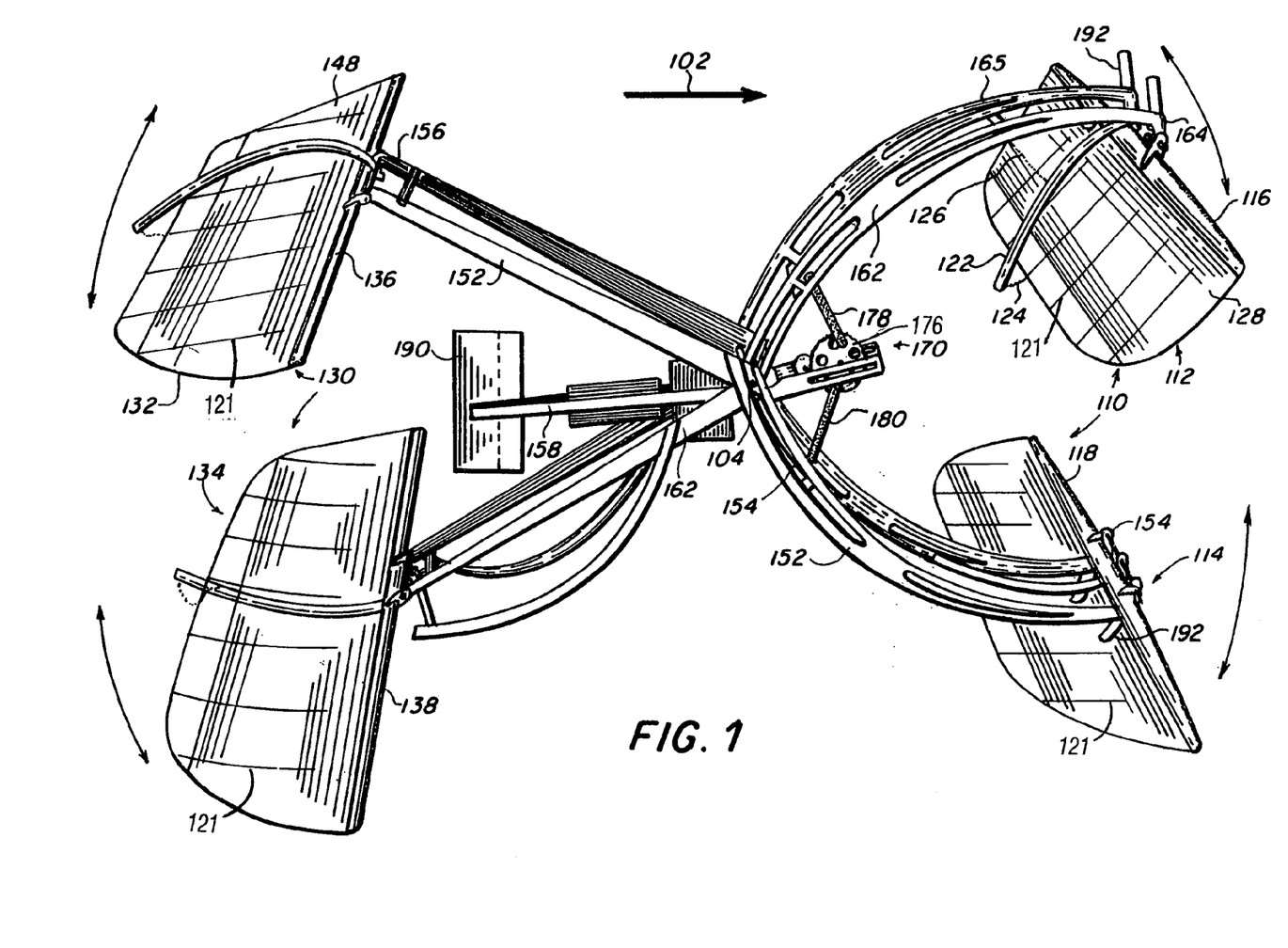
FIG. 1 illustrates an apparatus in accordance with an embodiment of the invention.

FIG. 1 illustrates an embodiment of a small vehicle 100 for flying through the air. The vehicle 100 is also described in "Development and Testing of Unconventional Micro Air Vehicle Configurations", Proc. of Unmanned/Unlimited Conference, AIAA, September 2003. The motion of the wings generates thrust which propels the vehicle in the forward direction of motion 102 shown in FIG. 1.

The vehicle 100 employs a forward pair of wings 110 and a rearward pair of wings 130, a body or support structure 150 supporting the wing pairs 110 and 130, and a drive mechanism 170 which drives the wing pairs together and apart to propel the vehicle 100 through the air in a forward direction of motion 102. The device can also hover and fly upward and downward, as described in greater detail in later paragraphs. In addition, the vehicle 100 can propel itself along the ground or other surface.

In the embodiment illustrated in FIG. 1, the structure 150 includes at least two beams 152 and 162 which are pivotally attached to each other. Each beam has one wing attached to its forward end and one wing attached to its rearward end. Each beam is pivotally attached at a central portion to a central portion of the other beam at the pivot axis 104. For example, the forward end 164 of the beam 162 is pivotally attached to the upper wing 112 at a leading edge 120 of the upper wing 112. The other (rearward) end 166 of the beam 162 attaches to the lower wing 134 of the rear pair of wings 130. Similarly, the other beam 152 has a forward end 154 attached to the leading edge 138 of the rearward lower wing 134, and the other (rearward) beam end 156 is attached to the upper wing 132 at its leading edge 136. Each of the leading edges is pivotally attached to the corresponding beam so its leading edge can pivot and the wings can flap upward and downward.

The beams 152 and 154, and other structural members, can be formed of any suitable structural material that is sufficiently lightweight, strong, and stiff. Examples of suitable materials include, but are not limited to, epoxy-graphite or similar composites, wood, foamed plastic, lightweight metal alloys, plastic film, paper, fabric or combinations of these materials.

Each wing includes a leading edge, formed of a relatively stiff material, attached to a forward portion of a membrane or sheet. The membranes are preferably a material that is sufficiently flexible to reverse camber during the up and down strokes as the vehicle 100 moves through the air. The membrane or sheet can be a thin Mylar sheet of, or other suitable material. The membrane or sheet can be approximately 5 microns in thickness, or greater or lesser. In FIG. 1 for example, the forward upper wing, for example, includes a membrane 128 attached to the leading edge 116. Battens 121 can be arranged toward the trailing edge of the wing to stiffen the membrane and to prevent aeroelastic deformation that might otherwise occur when the wing is flapped at frequencies above 10 Hz.

A drive mechanism 170 is arranged to drive the forward portions of the beams 162 and 152 together and then apart to cause the forward pair of wings 110 to move together and apart, and to cause the rearward pair of wings 130 to move together and apart. The movement of the wing pairs 110 and 130 generates thrust to propel the vehicle 100 through the air, as discussed in more detail in later paragraphs.

The drive mechanism 170 can be any suitable device driving the wing pairs together and apart. The drive mechanism 170 can include a power source such as a battery, an electric motor or an internal combustion engine. In the example illustrated in FIG. 1, the drive mechanism 170 includes a battery 172, a four watt electric motor, and a gear mechanism 176 geared to provide 8 to 10 Hz oscillation of the beams at cruise speed. In one example, the battery is a lightweight 3.6 gram lithium-ion polymer battery weighing less than 4 grams with a capacity of approximately 135 mA-hr, and the electric motor can be a small lightweight motor which draws about 1 Ampere, although various other batteries and motors can be used. The central fuselage includes the motor and drive mechanism by which the beams are flapped, the power source, the vehicle control mechanisms, and payload, and is suitably attached to the vehicle at its pivot axis. When both of the vehicle beams 152 and 162 are mirror images and have identical mass, the vehicle is dynamically balanced, so that the vehicle's center of mass is not driven in a vertical oscillation by the flapping motion. This is advantageous for carrying payloads in a flapping wing vehicle, in that the central fuselage does not vibrate violently in flight, a common problem with flapping wing aircraft.

A gear mechanism 176 is illustrated in FIG. 1 for driving linkages 178 and 180. The linkage 178 is attached to the gear 176 at one end and to a cross member 164 of the forward portion of the beam 162 at the other end. Similarly, one end of the linkage 180 is attached to the gear 176 and the other end of the linkage 180 is attached to a cross member 154 of the forward portion of the beam 152. As the gear 176 rotates, the outer ends of the linkages 178 and 180 simultaneously pull the forward portions of the beams 152 and 162 toward each other. As the gear 176 continues to rotate, the linkages 176 and 180 simultaneously push the forward portions of the beams 152 and 162 apart.

The vehicle 100 can also include at least one receiver for receiving control signals from a remote transmitter, e.g., a radio receiver for receiving radio signals. The control signals can include one or more of rudder control signals, speed control signals, and trim/pitch control signals. The vehicle 100 can thus be remotely controlled by a ground operator. Alternatively, the device can be controlled autonomously by a suitable automatic pilot, or can fly stably uncontrolled in free-flight.

An optional rudder 190 can be provided for steering the vehicle. In the embodiment illustrated in FIG. 1, the rudder 190 is attached at a rear portion of the fuselage 158. The rudder 190 can include a receiver for receiving radio commands from a remote operator.

The beams 152 and 162 are preferably mirror-images of each other for balanced motion of the beams and wings. The beams 152 and 162 are driven with a scissoring motion to drive the leading edges of the wings alternately together and apart. Each wing within a pair oscillates in opposition to its mate, so that they alternately clap together, at their axis of symmetry, and move vertically apart.

Although not wishing to be bound by any particular theory, the applicant believes that as the leading edges contact each other first and the point of contact between the wings travels aft across the chord, a pulse of positive air pressure is created at the trailing edges. The beams 152 and 162 then reverse direction and move apart, driving the wings apart. The leading edges of the surfaces separate from each other before the rest of the wing surface, thus generating a negative air pressure region between the leading edges. The negative pressure created at the front of the wings and the positive pressure generated at the rear of the wings is believed to increase the thrust of the flapping motion.

Figure 2:
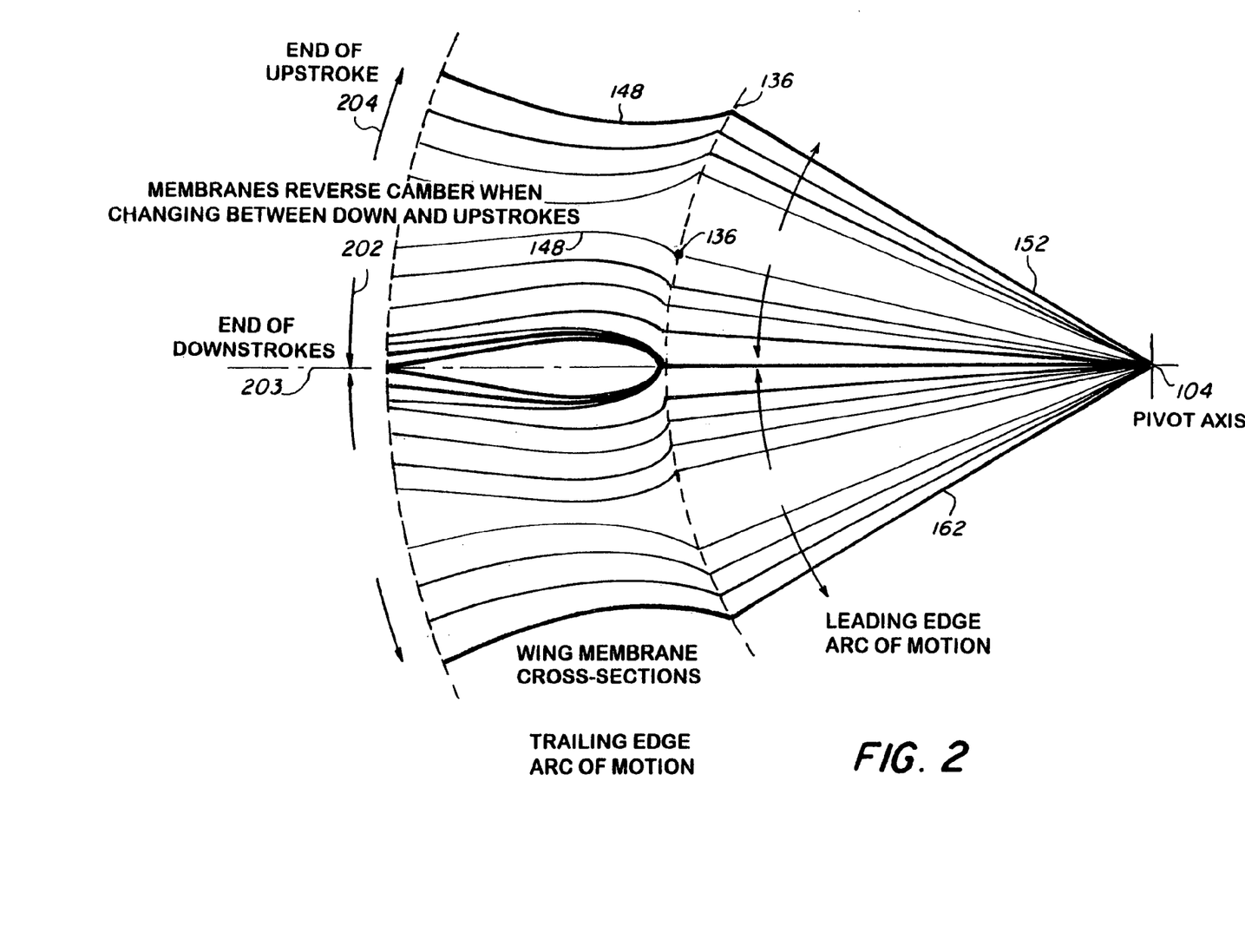
FIG. 2 illustrates the movement of a pair of flapping wings as their leading edges move toward and away from each other.
Figure 3:
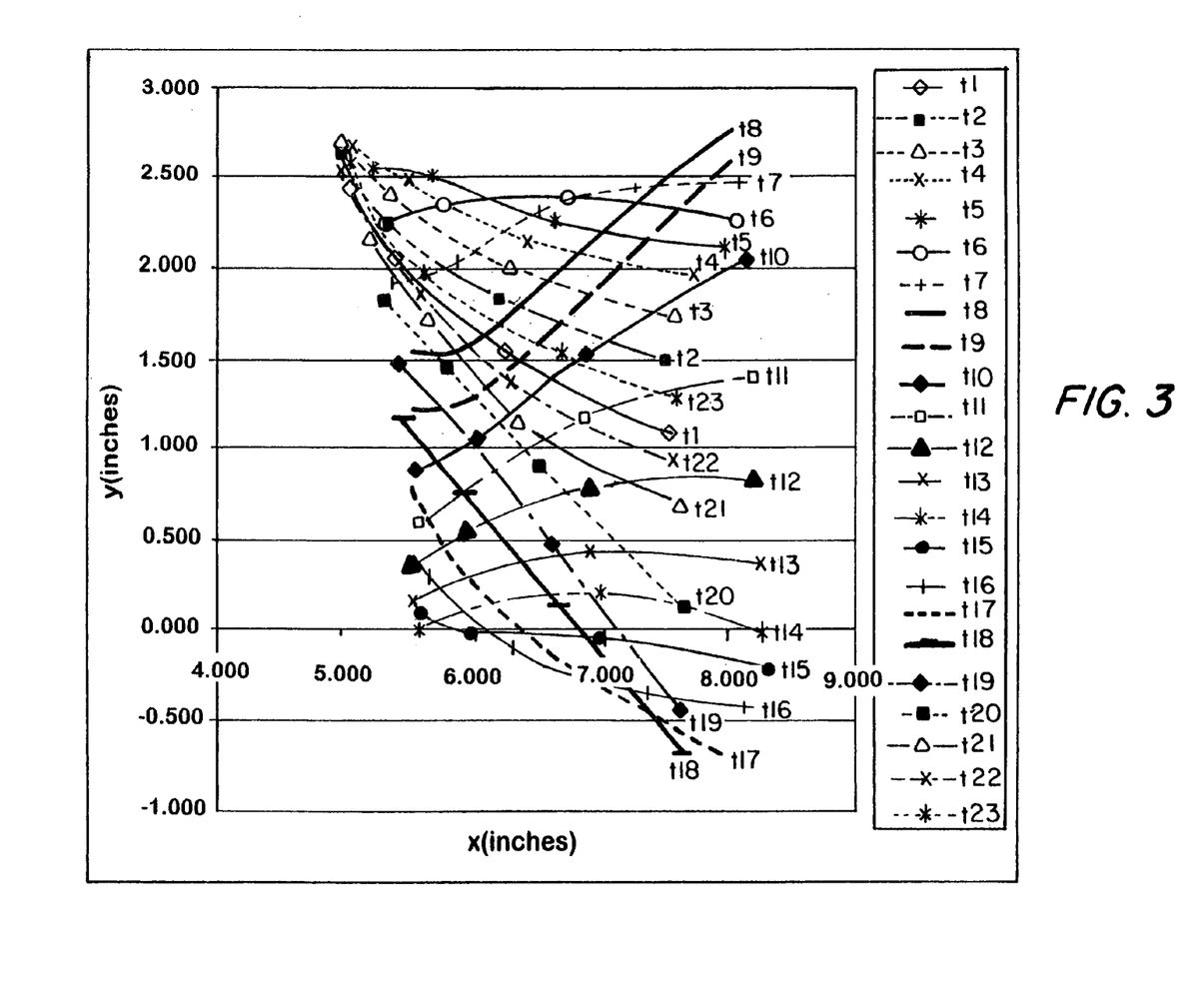
FIG. 3 illustrates the motion of one of a pair of flapping wings.

The mechanism of thrust generation can be better understood by referring to FIGS. 2 and 3. FIG. 2 illustrates the motion of the rear pair of flexible wings 132 and 134 as the rearward portions of the beams move together and apart. At the end of the downstroke 202, the upper wing leading edge 136 moves toward the horizontal centerline 203, the flexible wing membrane 148 trails the leading edge. At the end of the upstroke 204, as the upper wing leading edge 136 moves away from the horizontal centerline 203, the flexible wing membrane 148 trails the leading edge. Thus, during the upstroke (as the beams move apart), the camber of the wings is opposite the camber of the wings during the downstroke (as the beams move together).

An experimental procedure for determining the position of the wings during flight is as follows. During the procedure, the vehicle 100 is clamped in a fixed position, facing into a horizontal airflow of approximately 7.5 feet per second. Four luminescent markers are placed on each of the four wings, each at a constant spanwise location. The first marker is placed at the leading edge, the second marker is placed one centimeter behind the leading edge, the third at mid-chord, and the last on the trailing edge of the wing. The motion of the wings can be captured by a Canadian Photonics Laboratory MS10K-CCD high speed digital camera at a frame rate of 200 Hz. The captured images can then be digitized, and averaged over two or more cycles of flapping oscillation.

FIG. 3 illustrates the cross sectional shape and position of the upper wing of the rear pair of wings during testing of the vehicle illustrated in FIG. 1, averaged over two cycles of flapping oscillation. Vertical movement of the wing is represented on the y axis. Along the x axis, the leading edge of the wing is at the left side of each wing representation, and the trailing edge of the wing is at the right side of each wing representation. As seen in FIG. 3, the wing has a chord length of approximately 2.75 inches and its leading edge travels approximately 2.75 inches upward from its lowermost point to its uppermost point. At the position t1, the leading edge of the wing is approaching the its outermost position. The leading edge reverses direction between frames t4 and t5, while the trailing edge continues to move upward. The downstroke is illustrated at frames t4 through t13, and the upstroke is illustrated at frames t14 through frames t4. A comparison of the curvature of the wing when the wing is approaching the end of the downstroke, (frames t11 through t14) with the curvature of the wing while it is moving upward (frames t16–t17) illustrates that the flexibility of the wing allows the camber of the wing to reverse during the upstroke and the downstroke.

Figure 4A:
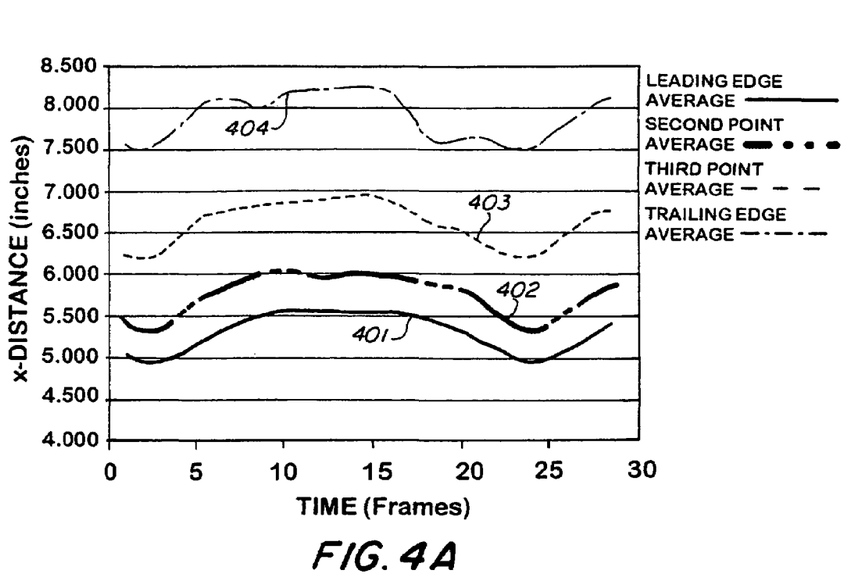
FIGS. 4A and 4B illustrate the motion of one of a pair of flapping wings.
Figure 4B:
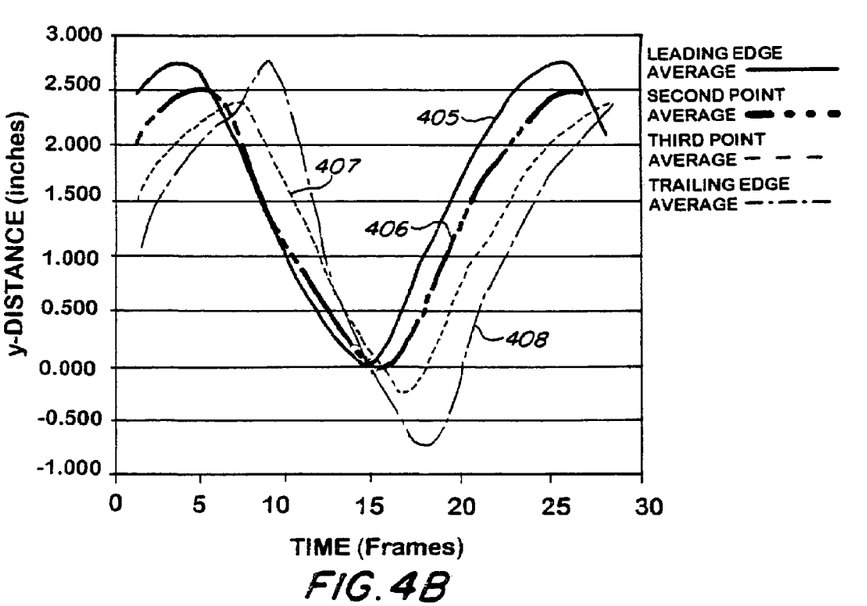

FIGS. 4A and 4B illustrate the motion of the four luminescent markers over the test vehicle during a cycle. Plotted curves 401, 402, 403, and 404 illustrate the averaged distance each of the luminescent markers move during a cycle in an x direction, where the x axis corresponds to the direction of air movement over the test vehicle. Plotted curves 405, 406, 407, and 408 illustrate the motion of the four luminescent markers along a y axis during a cycle, where the y axis corresponds to the vertical direction when the vehicle is fixed in a horizontal orientation and the air flow is in the horizontal x direction.

Additional test and simulation results are found in "Development and Testing of Unconventional Micro Air Vehicle Configurations", Proc. of Unmanned/Unlimited Conference, AIAA, September 2003 by Kellogg, J. et al.

The body can be shaped and the drive mechanism 170 can be geared to allow the downstroke of both the front and the rear wings to occur approximately simultaneously, with the wings of the two pairs coming into contact with each other at the end of the downstrokes. Thus, leading edges of the forward wings will come into contact with each other at the end of the downstroke, and the rearward pair of wings will come into contact with each other at the end of the downstroke. As the forward portion of the beams are driven together, the front pair of wings moves toward each other. At the end of this downstroke, the wings clap together. The forward portion of the beams are then driven apart, driving the leading edges of the wing pairs to move away from each other. To achieve this simultaneous wing clapping, the beams 152 and 162 have a pivot axis 104 approximately midway along the length of each beam.

Each wing membrane trails the leading edge in moving away from the opposite wing. This "clap-fling" motion is known as "Weis-Fogh" motion, further details of which are described in Weis-Fogh, T., "Energetics and aerodynamics of flapping flight: a synthesis", in Rainey, R. C., ed., Insect Flight, Symposia of the Royal Entomological Society, No. 7, Blackwell, Oxford, pp. 48–72 (1976).

Each of the wings is connected to the corresponding beam end at approximately the midpoint of the wingspan. The stiff leading edge of each wing allows each wing to flap as a single unit, in contrast to the wings of birds and insects that are flapped at their roots. As the airfoil formed by the wing membrane and leading edge flaps up and down, its movement is constrained by the arc of motion of the wing's leading edge and by an optional boom at the trailing edge, so that the airfoil can passively assume a cambered airfoil shape. The leading edge is free to pivot over its range of motion, so the wing can change angle of attack passively on each half cycle, from a positive angle of attack on the upstroke to a negative angle of attack on the downstroke. The wing camber also reverses on each half cycle, producing efficient flapping-wing thrust. This camber can be adjusted by changing the tension of the wing membrane.

As seen in FIG. 1, each of the wings 112, 114, 132, and 134 has a corresponding boom to limit the outward extent of the wing membrane. The trailing edge of each wing can be attached to the boom by an optional thread or other connector to limit the range of motion of the trailing edge of the wings. For example, the boom 122 corresponding to the upper forward wing 112 is attached to the trailing edge of the wing membrane 128 by a thread 124. The boom 122 pivots on the same axis as the forward leading edge 116, however, the outward travel of the boom 122 is constrained by a thread or other connector 126 which limits the forward rotation of the boom 122. The boom 122 can also be also prevented from rotating past the plane of the beam 162 by a beam cross member 165 or other suitable structure or device.

Figure 5:
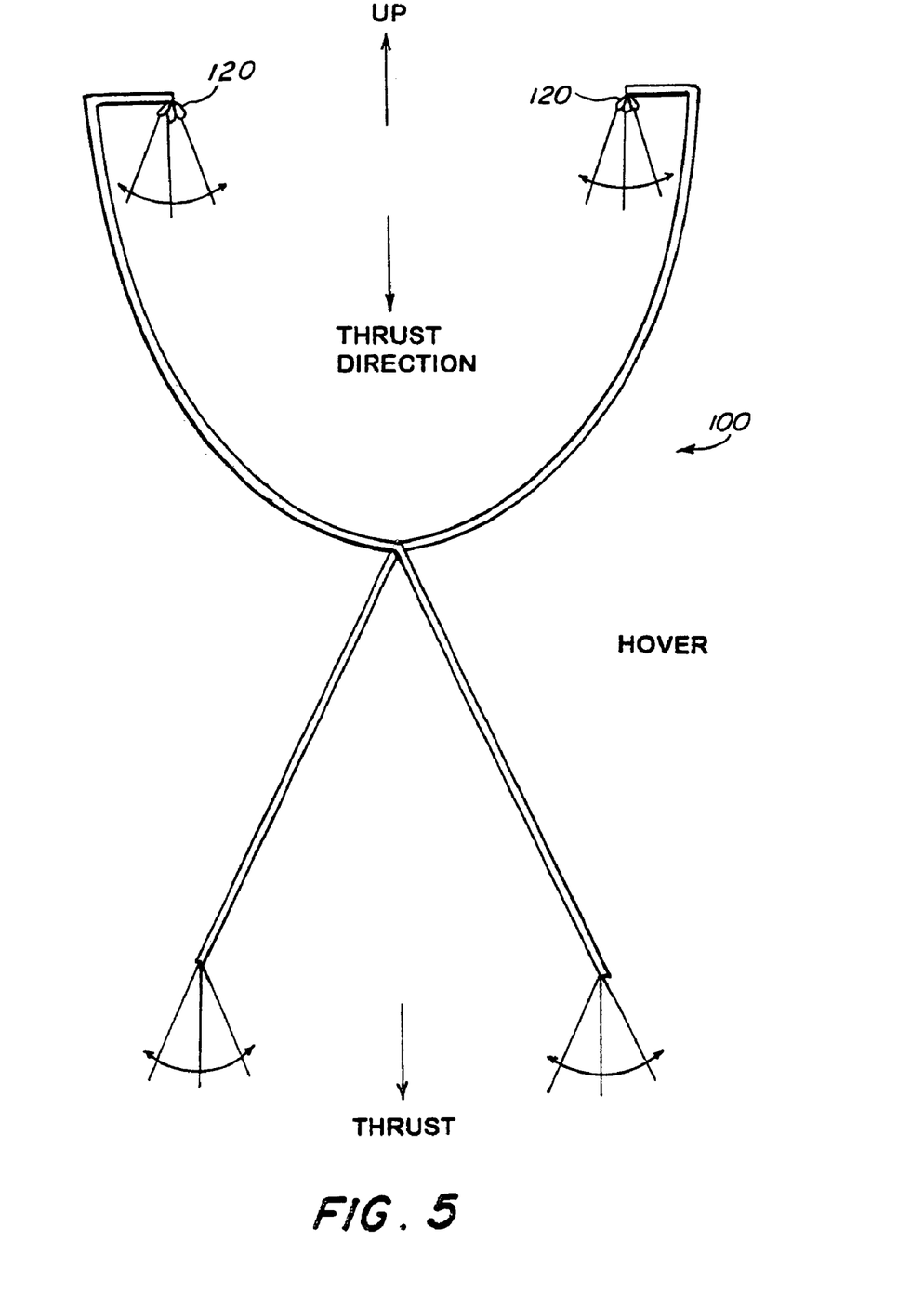
FIG. 5 illustrates the range of motion for the flapping wings during hovering.

FIG. 5 is a schematic illustration of the beams of the vehicle 100 intended to show the vehicle 100 in a hovering position. For hovering, the vehicle 100 is oriented vertically with its forward end pointed upward and the forward wings and rearward wings oriented generally vertically. For both the forward and the rearward wing pairs 110 and 130, the leading edges have an arc of motion centered on a vertical axis 601. As the beams are driven together and apart, each wing pair creates vertically downward thrust. The speed of oscillation can be controlled to maintain the vehicle at a desired height.

Figure 6A:
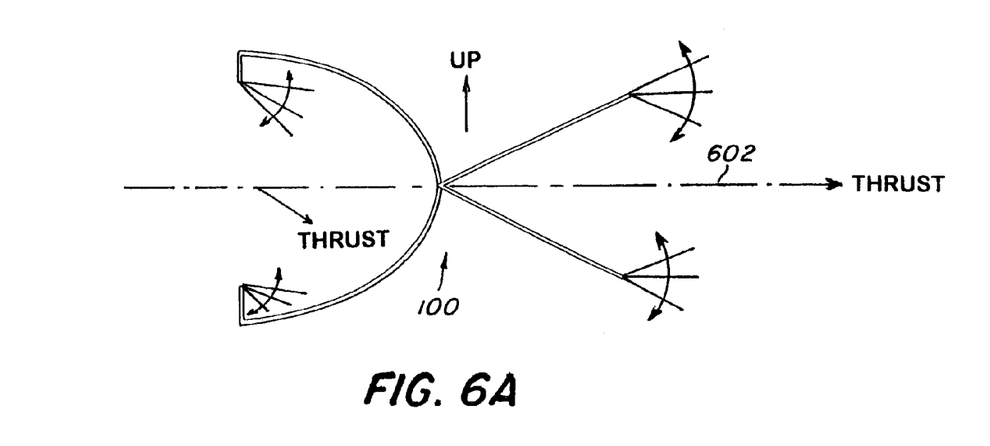
FIGS. 6A and 6B illustrate schematically the attitude of the vehicle and the position of the wings according to an embodiment of the invention for forward flight.
Figure 6B:
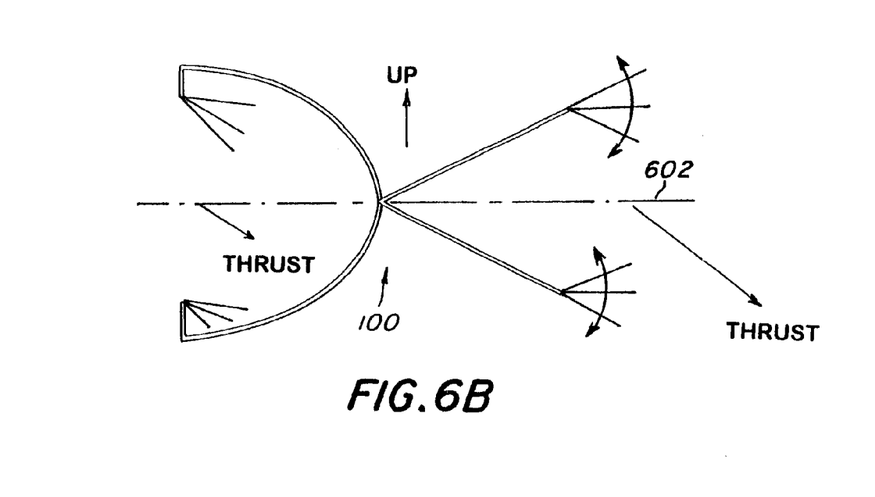

As illustrated in FIGS. 6A and 6B, the vehicle 100 can also be steered upward or downward by changing the pitch of the wings. For example, in FIG. 6A, the rearward pair of wings is oriented so the thrust from the rearward pair of wings is horizontal, and the forward pair of wings is oriented so the thrust from the forward wings is rearward and downward. In this orientation, when the beams are oscillated, the vehicle 100 will pitch upward. In FIG. 6B, both the forward and rearward pairs of wings are oriented so their thrust is rearward and downward, allowing the vehicle to climb while remaining approximately horizontal.

To control the arc of motion of the wings, the vehicle 100 can include mechanical stops that limit the angular travel of the wings. The mechanical stops can be arranged to stop the movement of the leading edges or of the boom, among other alternatives.

By altering the position of the mechanical stops that limit the angular travel of the wings, the upward and downward pitch of the vehicle can be controlled with only a small amount of onboard power. In addition, each stop bears a load during one half of the flapping cycle, and bears no load during the opposite half. By employing control actuators that move when the stops are unloaded, control forces are greatly reduced. Other suitable devices or structures for controlling the position of the leading edge may also be employed.

The vehicle 100 can also function as a ground vehicle. For example, when the device is resting on the ground or on another surface, the beams 152 and 162 can be oscillated at a low speed at which the thrust is insufficient for flight. The wings in the embodiment illustrated in FIG. 1 are suitably driven at about 6 to about 10 Hz in forward flight, and more preferably, at 8 to 10 Hz. For ground motion, the wings are driven at a lower speed.

The motion of the lower beam ends on the ground causes the vehicle 100 to crawl forward, inchworm fashion. Optional feet can be located on the vehicle at the ground contact points to improve traction, and thus, to improve the forward motion on the ground. For example, feet 192 are located at the forward ends of the beams 152 and 162. Increasing the flapping rate allows the vehicle 100 to takeoff from the ground. Also, by suddenly and forcefully driving the beams apart, the vehicle can be made to hop off of the ground for vertical takeoff.

In addition, the vehicle 100 can right itself if it is knocked onto its side when on the ground. When knocked over, the vehicle 100 will rest on the ends of its wing leading edges. Simply drawing the two beams 152 and 162 together will cause the vehicle to topple over, either to an upright or upside-down position. If upside-down, the hopping technique can be used to cause the vehicle 100 to become airborne and right the vehicle. If feet 192 are installed on both the top and bottom of the vehicle 100, as shown in FIG. 1, ground locomotion can continue upside-down.

Although the foregoing description refers to flight of the vehicle through the air, the device is also suitable for flying through any fluid having suitable density and viscosity regimes. For example, the vehicles described herein are suitable for flying in thin gaseous environments and for moving through liquids, including, but not limited to water.

The vehicle 100 has several advantageous features. First, the vehicle 100 is capable of low-Reynolds number flight with agile maneuvering, hovering, ground locomotion, and takeoff from a confined space by hopping into the air. In addition, because the moving parts are dynamically balanced, the vehicle's center of mass is not driven in a vertical oscillation by the flapping motion. The vehicle has the capability to operate as an airborne sensor platform in confined spaces such as urban areas or inside buildings. The vehicle is capable of landing in small spaces that might otherwise be inaccessible, and remaining there as a remote sensor post. Possible missions for such a vehicle include: military reconnaissance, law enforcement surveillance, intelligence gathering, hazardous area inspections, video and photojournalism, environmental monitoring, etc. Because the vehicle is capable of flying, hovering, crawling, and hopping using the same drive mechanism for each function, the vehicle is lightweight, simple, and low cost compared to other air vehicles. In addition, the wing arrangement has a low power requirement, needing only approximately 3 watts to hover a 20-gram, 25-cm span vehicle having the configuration of FIG. 1.

The efficiency of overall thrust production can be improved by taking advantage of "vortex capture," by adjusting the distance between the front and rear pairs of wings and by modifying the timing between the clapping of the front pair of wings and the rear pair of wings. A rearward directed pressure pulse produced by the clapping motion of the forward wings will propagate aft, so as to pass over the rear wings just as they clap together. The rear wings will thus operate in an area of increased air pressure, resulting in increasing thrust. In this manner, the rear wing pair will recapture some of the energy expended by the forward wings.

Figure 7:
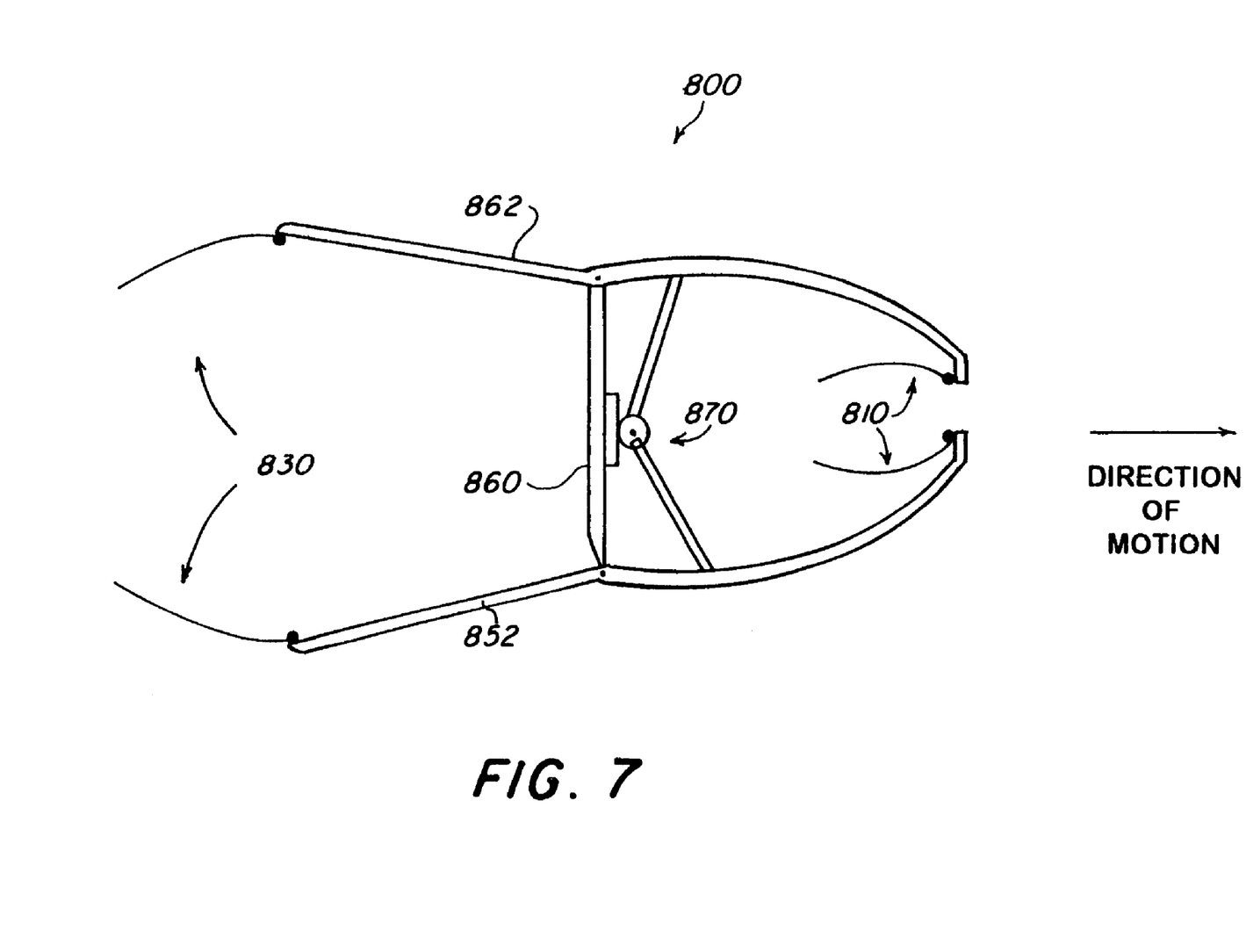
FIG. 7 illustrates another embodiment of a dual wing-pair air vehicle.

The embodiment illustrated in FIG. 7 is arranged to operate on the vortex capture principle. The vehicle 800 has a front wing pair 810 and a rear wing pair 830 connected to the supporting structure or body 850. Like the wings of the FIG. 1 embodiment, each of the wings is pivotally connected to the forward and rearward ends of the body 850 at an approximate midspan of each wing. The drive mechanism 870 drives the front wing pair 810 and the rear wing pair 830 so the front wing pair 810 moves together first, after which the rear wing pair moves together. The relative phasing between the clapping of the front and rear wings is accomplished by employing a different hinging arrangements for the drive beams compared to the embodiment of FIG. 1. In the embodiment shown in FIG. 8, the body or support structure 850 includes beams 852 and 862, each of which are pivotally attached to ends of a beam 860. The pivot points for beams 862 is above the pivot point for beam 852 while the vehicle is moving forward horizontally. The beams 852 and 862 are driven by the drive mechanism 870 to oscillate so that one pair of wings is clapping together when the other is at the point of its farthest separation. The distances between the pivot points and the wing pairs can be determined for a vehicle's parameters (e.g., dimensions, airspeed) to allow vortex capture by the rear wing pair, resulting in more efficient flight at a specific airspeed and flapping frequency. The features and details discussed above with reference to FIGS. 2–6 are also applicable to the vehicle of FIG. 7, and are therefore not repeated here.

For the vehicle embodiments discussed above, the primary flight control mechanism for the vehicle is differential adjustment of the flapping foils. However, conventional ailerons, elevator, and rudder can also be used for control in forward flight.

Figure 8:
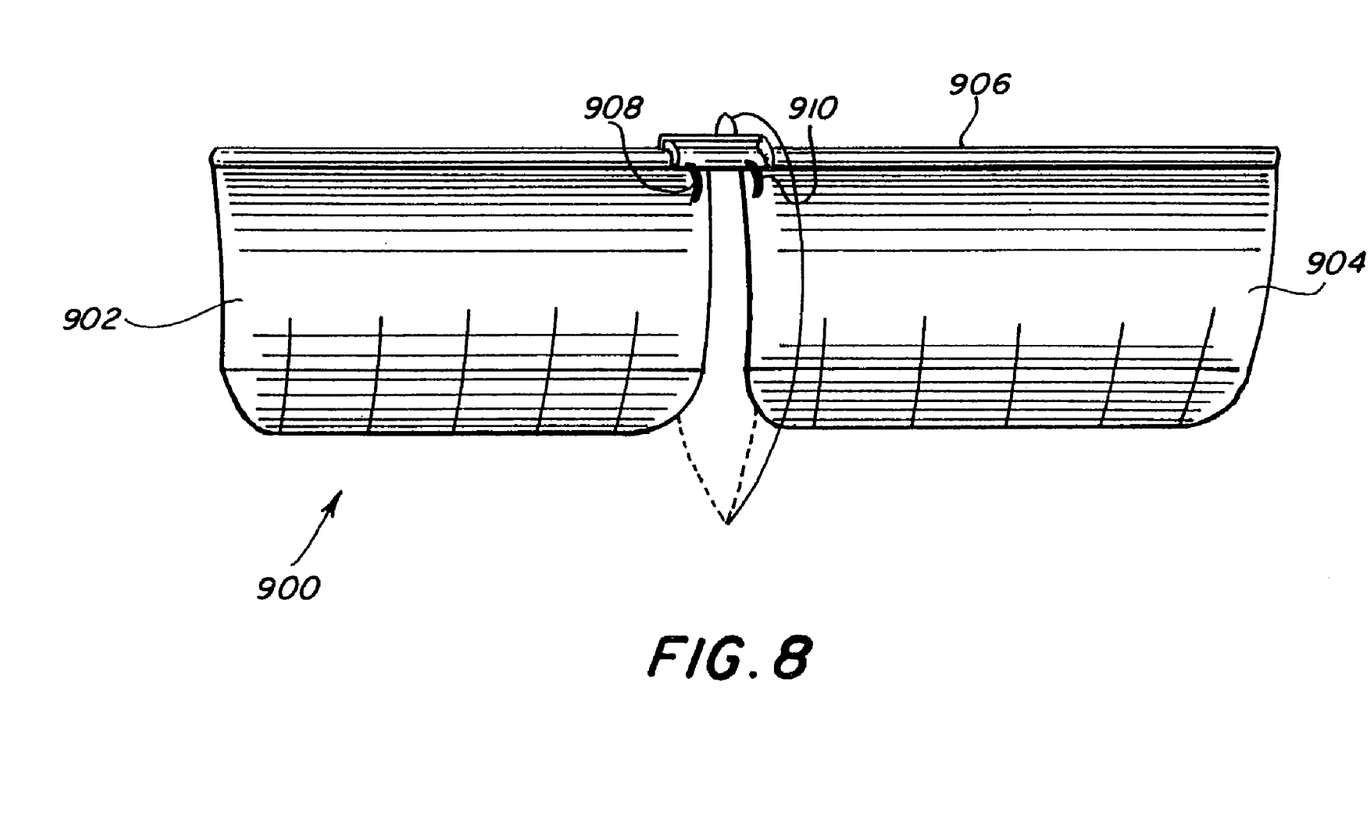
FIG. 8 is a view of a split-wing suitable for use in a dual wing-pair air vehicle.

As discussed in previous paragraphs, flight control can be achieved by adjusting the position of the mechanical stops. By increasing the maximum limit of angle of attack, thrust is directed in a more downward direction, while reducing the maximum angle of attack reduces the downward thrust component and increases the rearward component. This will provide pitch control. To provide roll/yaw control, one of the four flapping foils on the vehicle 100 or 800 can include a split-wing arrangement, illustrated in FIG. 8. The wing 900, illustrated in FIG. 8, is divided into left and right wing halves 902 and 904. The wing 900 is flapped as a single unit by moving the leading edge 906 up and down, in the manner discussed above for the FIG. 1 wings. The angle of attack mechanical stops 908 and 910 for each half are changed independently to produce differential thrust/lift. The wing halves may also be controlled together for pitch control, so that the wing 900 acts as a pair of elevons.

Another wing that is suitable for use in the vehicle 100 or 800 is an elliptically shaped wing (not shown) having a flexible membrane or sheet surrounded by a relatively stiff perimeter member. In this embodiment, one of the long sides of the perimeter member acts as the leading edge and is attached at approximately its midpoint to the beam, and the other long side of the perimeter member acts as the trailing edge of the wing. The flexible membrane can flex to produce a reversing cambered airfoil surface as the wing is flapped.

The flapping wing vehicles illustrated in FIG. 1 and FIG. 7 have several advantages over small vehicles having fixed wings and propellers. For very small vehicles, the low Reynolds numbers and low speeds encountered can reduce airfoil performance as a result of viscous boundary layer effects that significantly reduce the efficiency of conventional rigid wing and propeller vehicles. For propellor driven vehicles inn the low Reynolds number region of approximately 2,000 to 30,000 with low speeds in the 2–5 meter per second range, the airfoil performance degradation significantly reduces propeller efficiency as the size of the vehicle decreases. Although the average propeller blade's airspeed is higher than the wing airfoil's, the propeller blade chord is at least one order of magnitude smaller than the wing chord. Whereas the wing of a small air vehicle may be sized to operate just outside this Reynolds number regime, at least part of the propeller blade will be operating within it. Flapping surfaces can be dynamically advantageous for propulsion and flight in the low Reynolds number regimes. The flapping wing vehicles described herein can be made much smaller than propellor driven air vehicles.

The invention has been described with reference to certain preferred embodiments thereof. It will be understood, however, that the invention is not limited to the preferred embodiments discussed above, and that modification and variations are possible within the scope of the appended claims.

What is claimed is:

1. A vehicle for moving through a fluid, the vehicle comprising:
 a forward portion and a rearward portion opposite the forward portion,
 a first pair of wings arranged at the forward portion of the vehicle;
 a second pair of wings arranged at the rearward portion of the vehicle; and a body connected to the forward pair of wings and connected to the rearward pair of wings, the body being arranged to drive the forward pair of wings alternately toward each other and apart and the body being arranged to drive the second pair of wings alternately toward each other and apart, wherein the body includes at least two beams pivotally connected to each other at a central portion of the two beams, wherein pivotal motion of the beams in a direction away from each other drives the forward pair of wings away from each other and drives the rearward pair of wings away from each other, and wherein pivotal motion of the beams toward each other drives the forward pair of wings toward each other and the rearward pair of wings toward each other.

2. A vehicle for moving through a fluid, the vehicle comprising:

a forward portion and a rearward portion opposite the forward portion, a first pair of wings arranged at the forward portion of the vehicle;

a second pair of wings arranged at the rearward portion of the vehicle; and a body connected to the forward pair of wings and connected to the rearward pair of wings, the body being arranged to drive the forward pair of wings alternately toward each other and apart and the body being arranged to drive the second pair of wings alternately toward each other and apart, wherein each of the wings has a leading edge connected to the body at a central portion of the leading edge.

3. A vehicle for moving through a fluid, the vehicle comprising:

a forward portion and a rearward portion opposite the forward portion, a first pair of wings arranged at the forward portion of the vehicle;

a second pair of wings arranged at the rearward portion of the vehicle; and a body connected to the forward pair of wings and connected to the rearward pair of wings, the body being arranged to drive the forward pair of wings alternately toward each other and apart and the body being arranged to drive the second pair of wings alternately toward each other and apart, wherein each of the wings has a wingspan and is pivotally connected to the body at a midpoint of the wingspan.

4. The vehicle according to claim 3, further comprising: a power source.

5. The vehicle according to claim 4, wherein the power source is a battery.

6. The vehicle according to claim 3, wherein each of the wings comprises a flexible sheet.

7. The vehicle according to claim 3, wherein the wings have a camber during an upstroke opposite of their camber during a downstroke.

8. The vehicle according to claim 3, wherein at least one of the wings includes a flexible sheet, a stiff leading edge, and a batten arranged at a rear portion of the wing.

9. The vehicle according to a claim 3, further comprising:

a first boom connected to a forward portion of the structure to limit the range of motion of one wing of the forward pair of wings, and a second boom connected to a forward portion of the structure to limit the range of motion of another wing of the forward pair of wings.

10. The vehicle according to claim 3, further comprising a receiver adapted to receive radio control signals for controlling at least one of vehicle speed and vehicle direction.

11. The vehicle according to claim 3, further comprising: a rudder for controlling vehicle direction.

12. The vehicle according to claim 3, wherein the body is arranged to simultaneously drive the forward pair of wings together and the rearward pair of wings together, and thereafter to simultaneously drive the forward pair of wings apart and the rearward pair of wings apart.

13. The vehicle according to claim 3, wherein the body is arranged to drive the forward pair of wings together and to thereafter drive the rearward pair of wings together.

14. The vehicle according to claim 3, wherein the wings of at least one of the forward and rearward pair of wings contacts each other during flight.

15. A vehicle for moving through a fluid, the vehicle comprising:

a forward portion and a rearward portion opposite the forward portion, a first pair of wings arranged at the forward portion of the vehicle;

a second pair of wings arranged at the rearward portion of the vehicle; and a body connected to the forward pair of wings and connected to the rearward pair of wines, the body being arranged to drive the forward pair of wings alternately toward each other and apart and the body being arranged to drive the second pair of wings alternately toward each other and apart, wherein each of the wings has a leading edge pivotally connected to the body, wherein the body includes at least two pivotally connected beams, a forward portion of one of the beams is connected to the leading edge of one wing of the forward pair of wings, and a forward portion of the other of the beams is connected to a leading edge of another wing of the forward pair of wings.

16. The vehicle according to claim 15, wherein at least one of the beams has an arcuate forward portion forward of the pivotal connection between the beams.

17. A vehicle for moving through a fluid, the vehicle comprising:

a forward portion and a rearward portion opposite the forward portion, a first pair of wings arranged at the forward portion of the vehicle;

a second pair of wings arranged at the rearward portion of the vehicle; and a body connected to the forward pair of wings and connected to the rearward pair of wings, the body being arranged to drive the forward pair of wings alternately toward each other and apart and the body being arranged to drive the second pair of wings alternately toward each other and apart, wherein at least one of the wings includes at least two independently movable wing surfaces arranged at opposite lateral sides of the vehicle.

18. A vehicle for moving through a fluid, the vehicle comprising:

a body having two ends, at least one pivot point, and at least two structural members connected at the pivot point, a first pair of wings, each wing of the first pair of wings being connected to one of the structural members at a midspan of the wing, a second pair of wings, each wing of the second pair of wings being connected to one of the structural members at a midspan of the wing, and a drive mechanism adapted to drive the first pair of wings toward each other and apart and to drive the second pair of wings toward each other and apart to propel the vehicle forward.

19. The vehicle according to claim 18, further comprising: a power source.

20. The vehicle according to claim 19, wherein the power source is a battery.

21. The vehicle according to claim 18, wherein each of the wings comprises a flexible sheet.

22. The vehicle according to claim 18, wherein the wings have a camber during an upstroke opposite of their camber during a downstroke.

23. The vehicle according to claim 18, wherein the body includes at least two beams pivotally connected to each other at a central portion of the two beams.

24. The vehicle according to claim 23, wherein pivotal motion of the beams in a direction away from each other drives the forward pair of wings away from each other and drives the rearward pair of wings away from each other, and wherein pivotal motion of the beams toward each other drives the forward pair of wings toward each other and the rearward pair of wings toward each other.

25. The vehicle according to claim 18, wherein each of the wings has a leading edge connected to the body at a central portion of the leading edge.

26. The vehicle according to claim 18, wherein each of the wings has a wingspan and is pivotally connected to the body at a midpoint of the wingspan.

27. The vehicle according to claim 18, wherein each of the wings has a leading edge pivotally connected to the body.

28. The vehicle according to claim 18, wherein the body includes at least two pivotally connected beams, a forward portion of one of the beams is connected to the leading edge of one wing of the forward pair of wings, and a forward portion of the other of the beams is connected to a leading edge of another wing of the forward pair of wings.

29. The vehicle according to claim 28, wherein at least one of the beams has an arcuate forward portion forward of the pivotal connection between the beams.

30. The vehicle according to claim 18, wherein at least one of the wings includes a flexible sheet, a stiff leading edge, and a batten arranged at a rear portion of the wing.

31. The vehicle according to a claim 18, further comprising:

a first boom connected to a forward portion of the body to limit the range of motion of one of the forward pair of wings, and a second boom connected to a forward portion of the structure to limit the range of motion of another of the forward pair of wings.

32. The vehicle according to claim 18, further comprising a receiver adapted to receive radio control signals for controlling at least one of vehicle speed and vehicle direction.

33. The vehicle according to claim 18, further comprising: a rudder for controlling vehicle direction.

34. The vehicle according to claim 18, wherein the body is arranged to simultaneously drive the forward pair of wings together and the rearward pair of wings together, and thereafter to simultaneously drive the forward pair of wings apart and the rearward pair of wings apart.

35. The vehicle according to claim 18, wherein the body is arranged to drive the forward pair of wings together and to thereafter drive the rearward pair of wings together.

36. The vehicle according to claim 18, wherein at least one of the wings includes at least two independently movable wing surfaces arranged at opposite lateral sides of the vehicle.

37. The vehicle according to claim 18, wherein the wings of at least one of the forward and rearward pair of wings contacts each other during flight.

* * * * *